(12) United States Patent
Asai

(10) Patent No.: US 8,269,794 B2
(45) Date of Patent: Sep. 18, 2012

(54) IMAGE PROCESSING APPARATUS

(75) Inventor: Atsushi Asai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1209 days.

(21) Appl. No.: 11/600,793

(22) Filed: Nov. 17, 2006

(65) Prior Publication Data

US 2007/0153005 A1  Jul. 5, 2007

(30) Foreign Application Priority Data

Dec. 1, 2005  (JP) .................. 2005-348383

(51) Int. Cl.
*G09G 5/00* (2006.01)
(52) U.S. Cl. ...................... 345/629; 345/473
(58) Field of Classification Search .................. 345/629, 345/473
See application file for complete search history.

(56) References Cited

U.S. PATENT DOCUMENTS 6,147,692 A * 11/2000 Shaw et al. .................. 345/643
6,539,354 B1 * 3/2003 Sutton et al. ................ 704/260

FOREIGN PATENT DOCUMENTS

| JP | 03-74777 A | 3/1991 |
|---|---|---|
| JP | 2001-34776 A | 2/2001 |
| JP | 2001-43400 A | 2/2001 |
| JP | 2002-197489 | 7/2002 |

OTHER PUBLICATIONS

Notification of Reasons for Refusal in Japanese Patent Application No. 2005-348383, dated Feb. 25, 2011, 5 pp.
Masahide Yuasa et al., "A Supporting Method for Selecting Facial Expressions of Animated Agents in Network-Based Negotiation," IPSJ SIG Technical Reports, Information Processing Society of Japan, Jul. 17, 2004, vol. 2004, No. 74, 11 pp.

* cited by examiner

*Primary Examiner* — Maurice L McDowell, Jr.
(74) *Attorney, Agent, or Firm* — Finnegan, Henderson, Farabow, Garrett & Dunner, L.L.P.

(57) ABSTRACT

An image processing apparatus includes an unconscious expression parameter storing unit configured to store a parameter specifying a facial expression that unconsciously appears in a steady state as an unconscious expression parameter, a conscious expression parameter storing unit configured to store a parameter specifying a facial expression that is consciously expressed from the steady state as a conscious expression parameter, a mixing unit configured to generate face model data by mixing the unconscious expression parameter and the conscious expression parameter, and a rendering unit configured to render a facial expression on the basis of the face model data.

8 Claims, 11 Drawing Sheets

FIG. 5

| FUNCTION | OPERATION |
| --- | --- |
| lean (face, duration, rotation, weight) | LEAN NECK AT SPECIFIED ANGLE |
| lookAt (face, duration, position, weight) | SHOOT A LOOK AT SPECIFIED POSITION |
| express (face, duration, gains, weight) | CREATE PREDETERMINED EXPRESSION |
| speak (face, voice) | MOVE MOUTH IN ACCORDANCE WITH SPECIFIED DATA |
| closeEye (face, duration, close) | CLOSE EYES IN ACCORDANCE WITH SPECIFIED DEGREE |

IMAGE PROCESSING APPARATUS

CROSS REFERENCES TO RELATED APPLICATIONS

The present invention contains subject matter related to Japanese Patent Application JP 2005-348383 filed in the Japanese Patent Office on Dec. 1, 2005, the entire contents of which are incorporated herein by reference.

BACKGROUND OF THE INVENTION

1. Field of the Invention

The present invention relates to image processing apparatuses, and, more particularly, to an image processing apparatus capable of generating facial expression animations, a processing method for the image processing apparatus, and a program causing a computer to perform the processing method.

2. Description of the Related Art

A technique for generating an animation by computing facial expression changes is generally used in the CG (Computer Graphics) field, and, in particular, is much in demand in the video game field and the field of movie-type special effects. Such a technique is referred to as "facial animation".

In order to generate an animation, the key frame method is generally used. The key frame method is an animation technique for generating a moving image by specifying the shape or position of an object every several frames and performing interpolation processing between the specified frames. Many applications or libraries used to support animation creation are configured to perform interpolation processing upon key frames specified by a user.

In order to apply such key frame specification for the facial animation, a system mixing various facial expressions and displaying the mixed facial expression on a display screen has been proposed. As an example of the system, there is a technique for interactively displaying a face shape by mixing elements such as fear, anger, and disgust (see, for example, Japanese Unexamined Patent Application Publication No. 2002-197489, FIG. 1).

SUMMARY OF THE INVENTION

In order to generate an animation using the key frame method, as described previously, a user is required to specify key frames. However, the specification of every key frame is a complicated task even if a supplementary tool is used for the specification, because the user cannot check the effect of an animation before the animation is actually played back. Furthermore, since patterns of human facial expressions include psychological features, it is difficult for a general user who does not possess adequate knowledge of the features to generate natural facial expressions from the ground up.

It is desirable to generate natural facial expressions in accordance with abstract instructions without specifying key frames one by one.

According to an embodiment of the present invention, there is provided an image processing apparatus that includes: an unconscious expression parameter storing unit configured to store a parameter specifying a facial expression that unconsciously appears in a steady state as an unconscious expression parameter; a conscious expression parameter storing unit configured to store a parameter specifying a facial expression that is consciously expressed from the steady state as a conscious expression parameter; a mixing unit configured to generate face model data by mixing the unconscious expression parameter and the conscious expression parameter; and a rendering unit configured to render a facial expression on the basis of the face model data. According to the image processing apparatus, an unconscious facial expression is mixed with a conscious facial expression, whereby a natural facial expression can be generated.

The image processing apparatus may further include a parameter updating unit configured to update the unconscious expression parameter stored in the unconscious expression parameter storing unit or the conscious expression parameter stored in the conscious expression parameter storing unit in response to a predetermined instruction. Consequently, each parameter can be updated in response to a detailed or an abstract instruction, and then the updated parameter can be reflected in the face model data.

The image processing apparatus may further include a face model data storing unit configured to store the face model data. The mixing unit may generate the face model data and store the generated face model data in the face model data storing unit in response to a first instruction. The rendering unit may acquire the face model data from the face model data storing unit and perform rendering processing on the basis of the acquired face model data in response to a second instruction. Consequently, the face model data generation can be performed in asynchronization with the face model data rendering.

According to an embodiment of the present invention, there is further provided an image processing apparatus that includes: a face model data storing unit configured to store face model data used to render a facial expression; an unconscious expression parameter storing unit configured to store a parameter specifying a facial expression that unconsciously appears in a steady state as an unconscious expression parameter; a conscious expression parameter storing unit configured to store a parameter specifying a facial expression that is consciously expressed from the steady state as a conscious expression parameter; a parameter update instructing unit configured to instruct updating of the unconscious or conscious expression parameter; a parameter updating unit configured to update the unconscious expression parameter stored in the unconscious expression parameter storing unit or the conscious expression parameter stored in the conscious expression parameter storing unit in response to the parameter update instruction; a face model data generation instructing unit configured to instruct generation of the face model data; a mixing unit configured to mix the unconscious expression parameter and the conscious expression parameter to generate the face model data and store the generated face model data in the face model data storing unit in response to the face model data generation instruction; a rendering processing instructing unit configured to instruct rendering of a facial expression; and a rendering unit configured to render a facial expression on the basis of the face model data stored in the face model data storing unit in response to the rendering processing instruction. According to the image processing apparatus, an unconscious facial expression is mixed with a conscious facial expression by giving a detailed or an abstract instruction, whereby a natural facial expression can be generated.

According to an embodiment of the present invention, there is still further provided an image processing method for an image processing apparatus, or a program for causing a computer to execute the image processing method for the image processing apparatus that includes an unconscious expression parameter storing unit configured to store a parameter specifying a facial expression that unconsciously appears in a steady state as an unconscious expression parameter and a conscious expression parameter storing unit configured to store a parameter specifying a facial expression that is consciously expressed from the steady state as a conscious expression parameter. The image processing method includes: acquiring the unconscious expression parameter from the unconscious expression parameter storing unit; acquiring the conscious expression parameter from the conscious expression parameter storing unit and mixing the acquired conscious expression parameter with the unconscious expression parameter when the consciously expressed facial expression is effective; generating face model data on the basis of the mixed parameter of the conscious and unconscious expression parameters when the consciously expressed facial expression is effective, or on the basis of the unconscious expression parameter when the consciously expressed facial expression is not effective; and rendering a facial expression on the basis of the face model data. According to the image processing method or the program, an unconscious facial expression is mixed with a conscious facial expression, whereby a natural facial expression can be generated.

According to an embodiment of the present invention, natural facial expressions can be generated in accordance with abstract instructions.

BRIEF DESCRIPTION OF THE DRAWINGS

FIG. 5 is a diagram showing various types of functions for updating a conscious expression animation parameter according to an embodiment of the present invention;

DESCRIPTION OF THE PREFERRED EMBODIMENT

Next, an embodiment of the present invention will be described with reference to the accompanying drawings.

Figure 1:
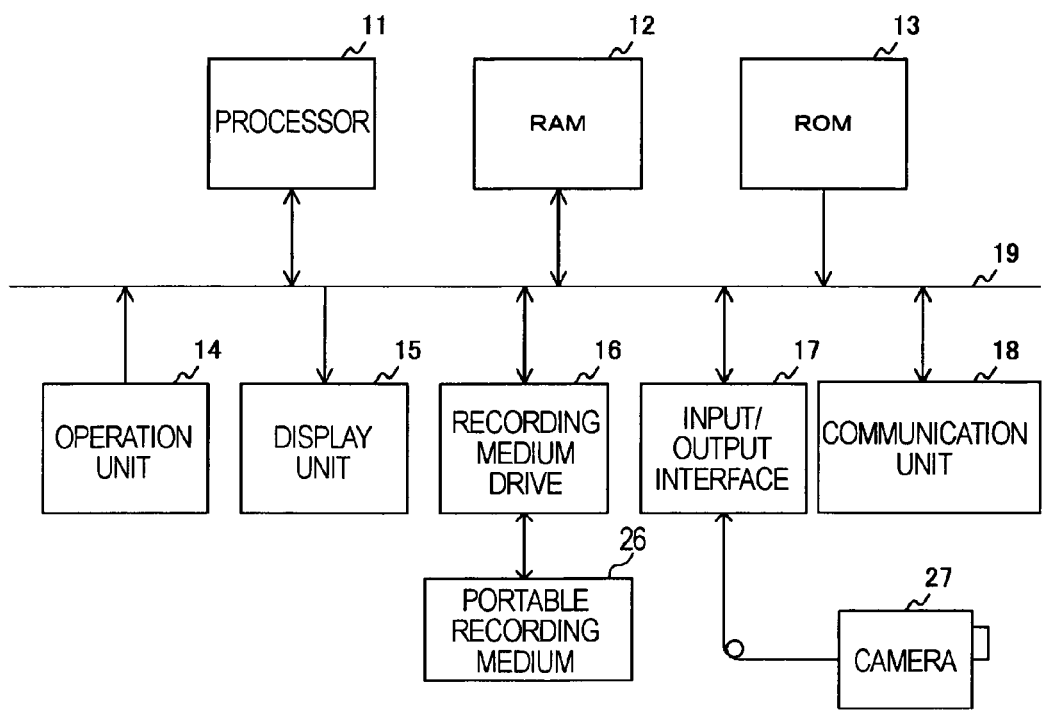
FIG. 1 is a diagram showing an exemplary hardware configuration of an image processing apparatus according to an embodiment of the present invention.

FIG. 1 is a diagram showing an exemplary hardware configuration of an image processing apparatus according to an embodiment of the present invention. This image processing apparatus is provided with a processor 11, a RAM (Random Access Memory) 12, a ROM (Read-Only Memory) 13, an operation unit 14, a display unit 15, a recording medium drive 16, an input/output interface 17, and a communication unit 18. These units are connected to each other via a bus 19.

The processor 11 is a processing device for executing an image processing program, etc. The RAM 12 is a memory for storing work data or the like required for the processor 11 to execute a program, and is configured with, for example, an SRAM (Static Random Access Memory) or a DRAM (Dynamic Random Access Memory). The ROM 13 is a memory for storing a program executed by the processor 11, a constant, etc., and is configured with, for example, an EPROM (Erasable Programmable Read-Only Memory) such as a flash memory.

The operation unit 14 receives an operation input from a user, and is configured with, for example, a keyboard and a mouse. The display unit 15 displays the result of image processing on a display such as an LCD (Liquid Crystal Display). The operation unit 14 and the display unit 15 may be integrated as a touch panel.

The recording medium drive 16 has a mechanism for controlling a recording medium, and reads or writes data from or onto a portable recording medium 26 such as a magnetic disk or a semiconductor memory attached thereto. The input/output interface 17 externally receives or transmits data, and is connected to a camera 27 to obtain an image captured by the camera 27. The communication unit 18 externally receives or transmits data using wired or wireless communication, and is configured with, for example, a LAN (Local Area Network) card.

Figure 2:
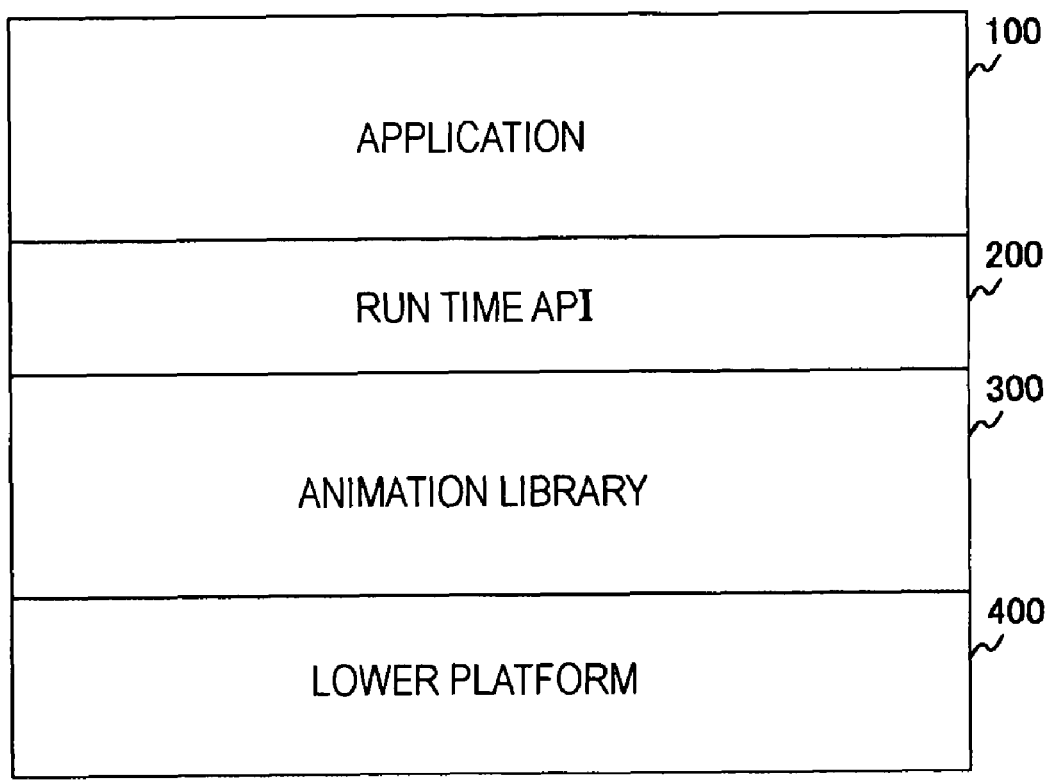
FIG. 2 is a diagram showing exemplary software layers according to an embodiment of the present invention.

FIG. 2 is a diagram showing exemplary software layers according to an embodiment of the present invention. Here, the roles of individual layers are sequentially defined in descending layer order as an application 100, a run time API (Application Program Interface) 200, an animation library 300, and a lower platform 400.

The application 100 is an application program for animating a facial expression. The animation library 300 is created by integrating a program for performing animation processing and a program for rendering a face as a library. Here, the library indicates a software component for embedding a specified function in an application.

The run time API 200 is an interface allowing the application 100 to call the animation library 300. In general, if a library is implemented using the C language, the entity of an API is a function, and if a library is implemented using the C++ or Java language, the entity of an API is a class definition. Although a single application or another form of software according to another embodiment of the present invention can be considered, the basic configuration does not change even in that case.

The lower platform 400 is low-level software such as an OS (Operating System) or a graphics environment. Another lower layer API different from the run time API 200 may be created between the animation library 300 and the lower platform 400.

Figure 3:
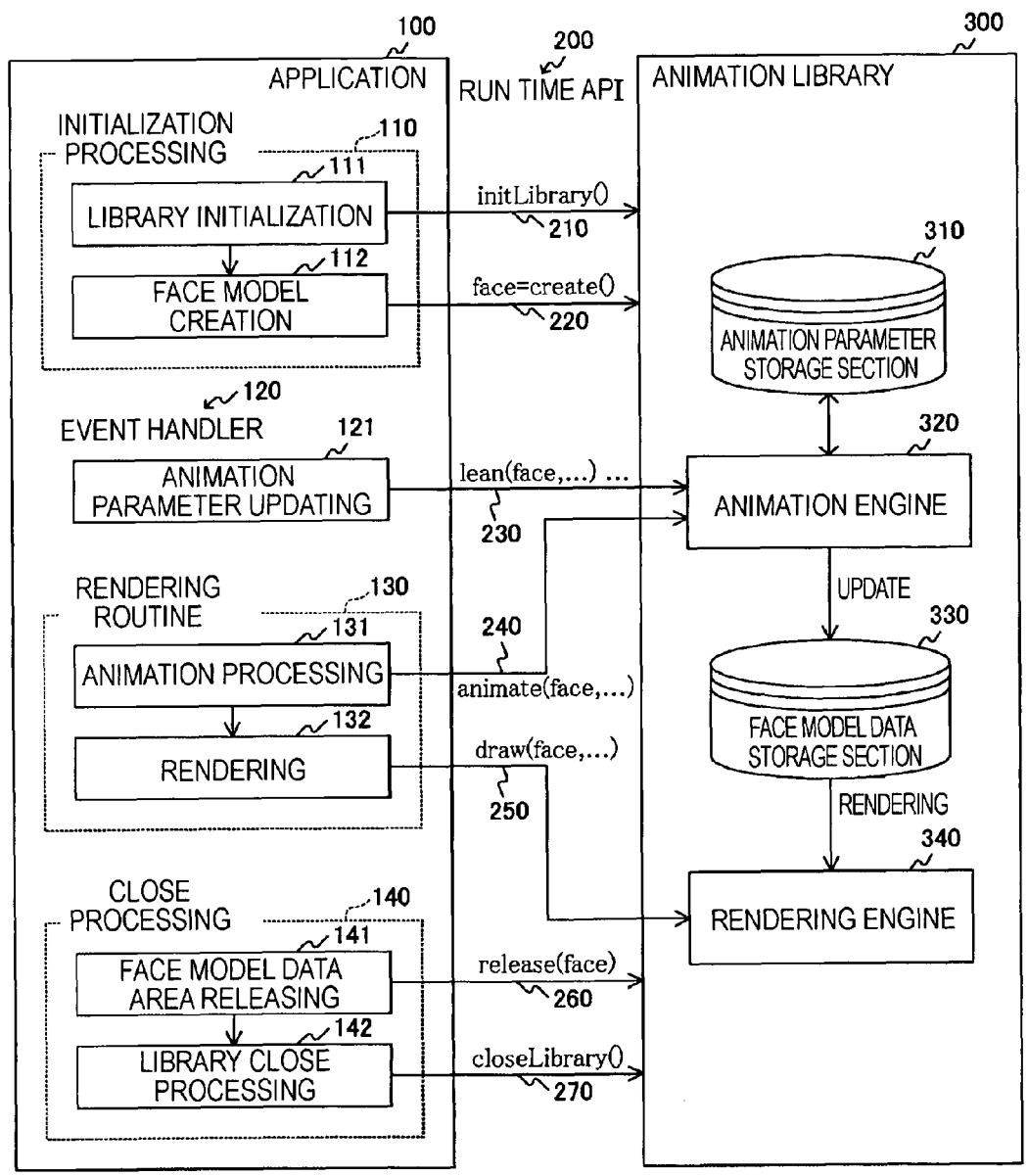
FIG. 3 is a diagram showing a mechanism for calling an animation library from an application using a run time API according to an embodiment of the present invention.

FIG. 3 is a diagram showing a mechanism for calling the animation library 300 from the application 100 using the run time API 200. The animation library 300 is provided with an animation parameter storage section 310 for storing an animation parameter that is used to configure an animation, a face model data storage section 330 for storing face model data that functions as a model required to render a facial expression, an animation engine 320 for updating the animation parameter and updating the face model data on the basis of the animation parameter, and a rendering engine 340 for performing rendering processing on the basis of the face model data.

The run time API 200 includes a function for initializing the animation library 300 (initLibrary function), a function for creating a data area for the face model data (create function), a function for updating the animation parameter (lean function, etc.), a function for updating the face model data on the basis of the animation parameter (animate function), a function for performing rendering processing on the basis of the face model data (draw function), a function for releasing the data area for the face model data (release function), and a function for closing the animation library 300 (closeLibrary function).

The processing details of the application 100 includes initialization processing 110 performed to use the animation library 300, an event handler 120 for managing an animation parameter updating event, a rendering routine 130 for rendering an animation, and close processing 140 for closing the animation library 300.

In the initialization processing 110, an initLibrary function 210 is used for library initialization 111 of the animation library 300, whereby the animation library 300 is initialized so as to allow the application 100 to use the animation library 300. In addition, in the initialization processing 110, a create function 220 is used to create a data area for data on a single face model. This create function 220 returns a handle "face" for identifying each set of face model data as a return value. Consequently, the application 100 is ready to use the animation library 300.

The face model data area is secured in the face model data storage section 330. The default value of the face model data is acquired from a still image such as a photograph or drawing (or one frame of a moving image). The still image may be acquired from the portable recording medium 26, or may be captured by the camera 27.

The event handler 120 calls a function 230 as appropriate so as to update the animation parameter. Consequently, in the animation library 300, the animation engine 320 updates the animation parameter stored in the animation parameter storage section 310.

As the rendering routine 130, an animate function 240 for updating the face modal data is called to perform animation processing 131. Consequently, in the animation library 300, the animation engine 320 reads out the animation parameter stored in the animation parameter storage section 310, and updates the face model data stored in the face model data storage section 330 on the basis of the read out animation parameter.

In addition, as the rendering routine 130, a draw function 250 for performing rendering processing is called. Consequently, in the animation library 300, the rendering engine 340 reads out the face model data from the face model data storage section 330, and performs rendering processing on the basis of the read out face model data.

Subsequently, as the close processing 140, a release function 260 is used for face model data area releasing 141. Finally, a closeLibrary function 270 is used for library close processing 142 of the animation library 300.

In this embodiment of the present invention, facial expressions are classified into a conscious facial expression type and an unconscious facial expression type in the above-described mechanism on the basis of the following consideration. A human facial expression is naturally and unconsciously changed. An eye blink, a slight leaning of the head, and a change in a line of sight correspond to this case. These unconscious changes in facial expression maintain a certain regularity, but appear randomly. In this embodiment, a facial expression is animated by imitating these unconscious changes in facial expression in the library. A generated animation is referred to as an unconscious facial expression animation. In order to generate the unconscious facial expression animation, a user is not required to explicitly specify details.

On the other hand, a human facial expression is consciously changed or is changed in accordance with an emotional change. An animation generated on the basis of the conscious changes in facial expression is referred to as a conscious facial expression animation. In this embodiment, the conscious facial expression animation is achieved as a highly abstract API. More specifically, the library does not use the key frame method, but prepares various animations such as an animation for expressing "speaking" and an animation for expressing "looking in a specified direction", and the user customizes these animations and mixes the customized animations to generate an arbitrary facial expression.

The library computes each of the unconscious facial expression animation and the conscious facial expression animation, and mixes them (assigns weights to each of them, and adds them) to generate a face model at a certain time, that is, data on one frame of a moving image. By repeating this processing for each frame, an animation is achieved.

Figure 4:
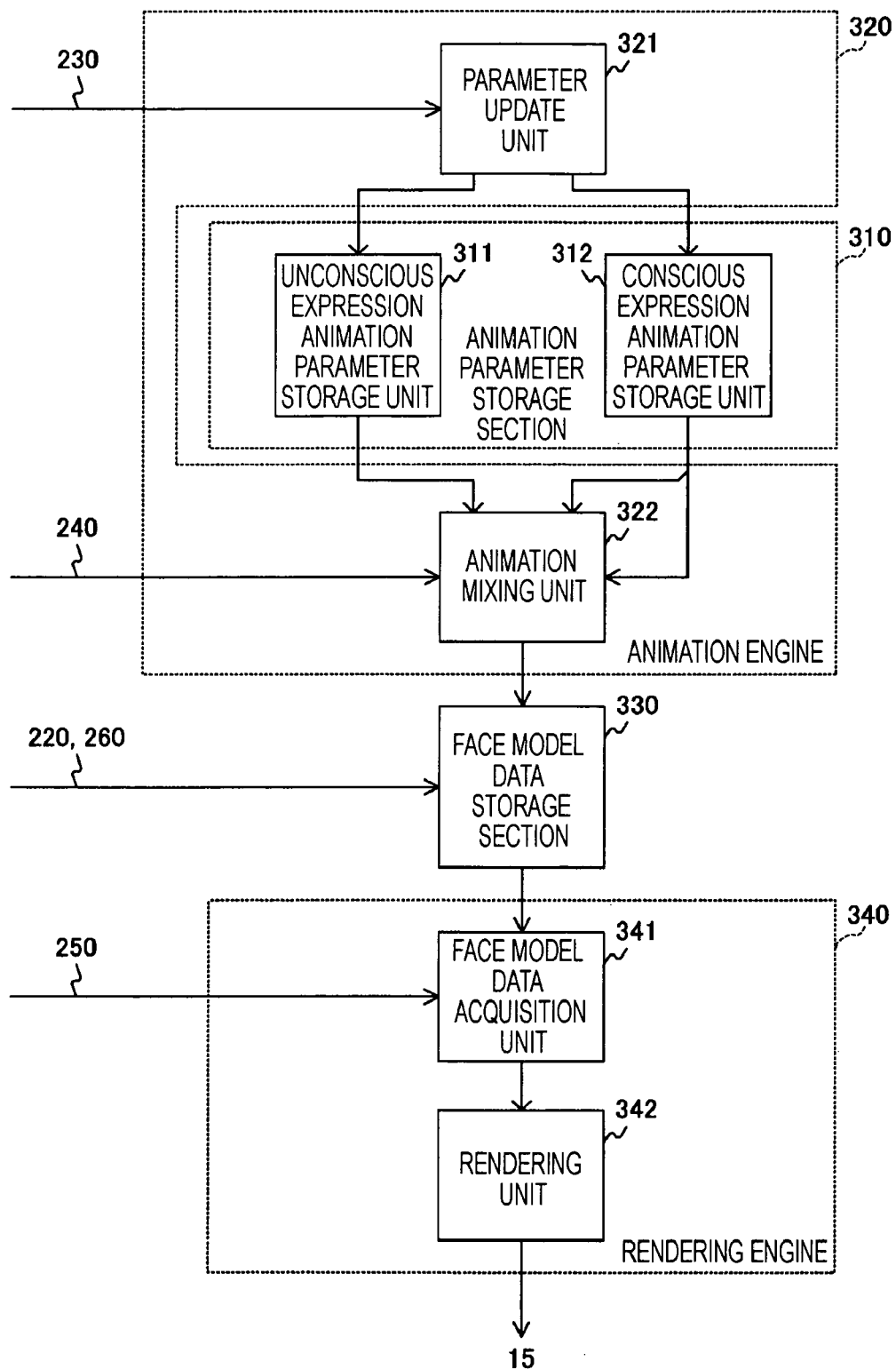
FIG. 4 is a diagram showing an exemplary configuration of the animation library according to an embodiment of the present invention.

FIG. 4 is a diagram showing an exemplary configuration of the animation library 300 according to an embodiment of the present invention. The animation parameter storage section 310 is provided with an unconscious expression animation parameter storage unit 311 for storing a parameter that specifies a facial expression that unconsciously appears in a steady state (hereinafter referred to as an unconscious expression animation parameter) and a conscious expression animation parameter storage unit 312 for storing a parameter that specifies a facial expression that is consciously expressed from the steady state (hereinafter referred to as a conscious expression animation parameter). The unconscious expression animation parameter is used to generate an unconscious facial expression animation, and the conscious expression animation parameter is used to generate a conscious facial expression animation.

The animation engine 320 is provided with a parameter update unit 321 and an animation mixing unit 322. The parameter update unit 321 updates the unconscious expression animation parameter stored in the unconscious expression animation parameter storage unit 311 or the conscious expression animation parameter stored in the conscious expression animation parameter storage unit 312 in response to an instruction transmitted from the event handler 120 included in the application 100.

The animation mixing unit 322 mixes the unconscious expression animation parameter stored in the unconscious expression animation parameter storage unit 311 and the conscious expression animation parameter stored in the conscious expression animation parameter storage unit 312 in response to an instruction transmitted from the rendering routine 130 included in the application 100 to generate face model data. The instruction from the rendering routine 130 can include the mixture ratio of the conscious and unconscious expression animation parameters.

The face model data storage section 330 stores the face model data generated by the animation mixing unit 322. Data area for this face model data is secured in the initialization processing 110 of the application 100, and is then released in the close processing 140.

The rendering engine 340 is provided with a face model data acquisition unit 341 and a rendering unit 342. The face model data acquisition unit 341 acquires the face model data from the face model data storage section 330 in response to an instruction transmitted from the rendering routine 130 included in the application 100. The rendering unit 342 performs animation rendering on the basis of the face model data acquired by the face model data acquisition unit 341. The result of the animation rendering is displayed on the display unit 15.

FIG. 5 is a diagram showing various types of functions for updating the conscious expression animation parameter according to an embodiment of the present invention. Here, a lean function, a lookAt function, an express function, a speak function, and a closeEye function are given by way of example.

The lean function is a function used to instruct an operation for leaning a neck at a specified angle. The first parameter "face" of this lean function is face model data used to generate an animation. The second parameter "duration" is a time taken to perform animation processing. The third parameter "rotation" is an angle of rotation of a neck. The fourth parameter "weight" represents a mixture ratio of the conscious and unconscious expression animation parameters.

The lookAt function is a function used to instruct an operation for shooting a look at a specified position. The first parameter "face", second parameter "duration", and fourth parameter "weight" of this lookAt function are the same as those of the lean function. The third parameter "position" is a direction of a line of sight.

The express function is a function used to generate a specified expression. The first parameter "face", second parameter "duration", and fourth parameter "weight" of this express function are the same as those of the lean function. The third parameter "gains" is a weighting factor for each facial expression that functions as an element. Individual facial expressions are mixed in accordance with the weighting factors to achieve a desired display. The details of this processing will be described later.

The speak function is a function used to instruct an operation for moving a mouth in accordance with specified data. The first parameter "face" is the same face model data used to generate an animation as that of the lean function. The second parameter "voice" is voice data simultaneously output along with an animation.

The closeEye function is a function used to instruct an operation for closing eyes in accordance with a specified degree. The first parameter "face" and second parameter "duration" of this closeEye function are the same as those of the lean function. The second function "close" is a factor representing a degree of eye closure.

The conscious expression animation parameter is updated using these functions, and is then mixed with the unconscious expression animation parameter using a function for updating the face model data (animate function), whereby a natural facial expression composed of an unconscious expression and a conscious expression can be generated.

Here, five functions have been described by way of example, but a function for updating the conscious expression animation parameter is not limited to these functions.

Figure 6:
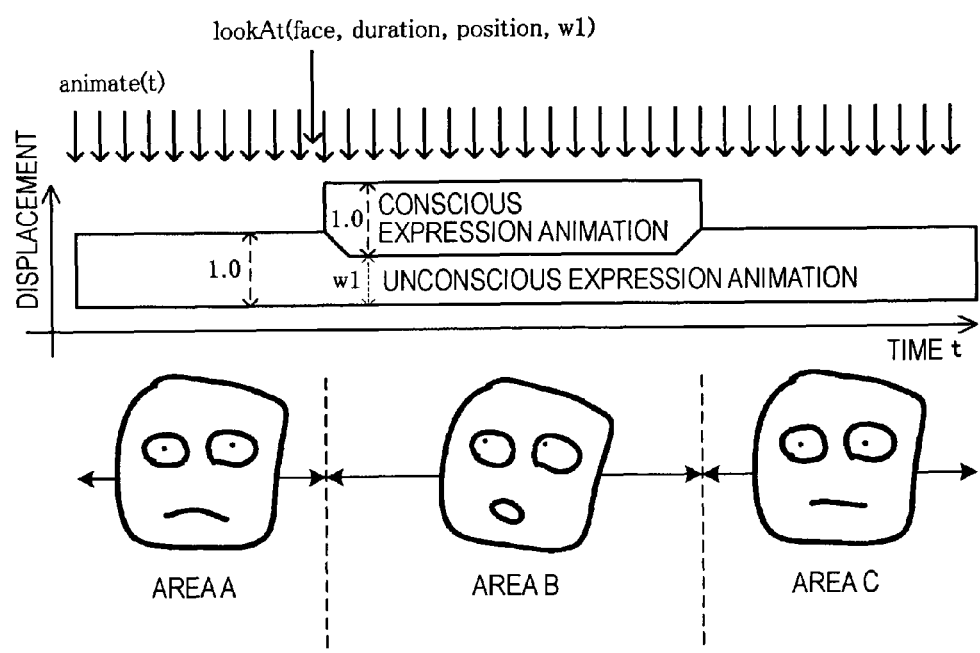
FIG. 6 is a diagram showing the process of mixing a conscious expression animation and an unconscious expression animation according to an embodiment of the present invention.

FIG. 6 is a diagram showing the process of mixing the conscious expression animation and the unconscious expression animation according to an embodiment of the present invention. Here, the case in which the above-described lookAt function is called by the event handler 120 is shown by way of example.

During animation display, the animate function is periodically called (for example, at a cycle of 59.94 times per second) to update the face model data stored in the face model data storage section 330. In an area A, since the display of the conscious expression animation is not instructed, the unconscious expression animation is only displayed. If the range from "0.0" to "1.0" is defined as the displacement of the weight for the unconscious expression animation, the weight for the unconscious expression animation indicates the maximum value "1.0" in the area A.

When the lookAt function is called, the conscious expression animation parameter is updated. Subsequently, the updated conscious expression animation parameter is mixed with the unconscious expression animation parameter at the time when the animate function is called soon after the conscious expression animation parameter has been updated. That is, since the lookAt function is called in asynchronization with the animate function, the lookAt function is reflected in the face model data when the animate function is called. Consequently, in an area B, a mixed facial expression of a conscious facial expression representing a facial expression that appears when someone looks in a specified direction and an unconscious facial expression that appears in the steady state is shown.

In the area B, the weight of the unconscious expression animation is specified by the fourth parameter w1 of the lookAt function. On the other hand, the weight of the conscious expression animation is assumed as "1.0". Accordingly, the weight ratio of the conscious expression animation to the unconscious expression animation is 1.0:w1.

The time period of the area B is specified by the second parameter "duration" of the lookAt function. When the time period specified by the second parameter "duration" has passed since the conscious expression animation was displayed, the unconscious expression animation is only displayed again in an area C.

Figure 7:
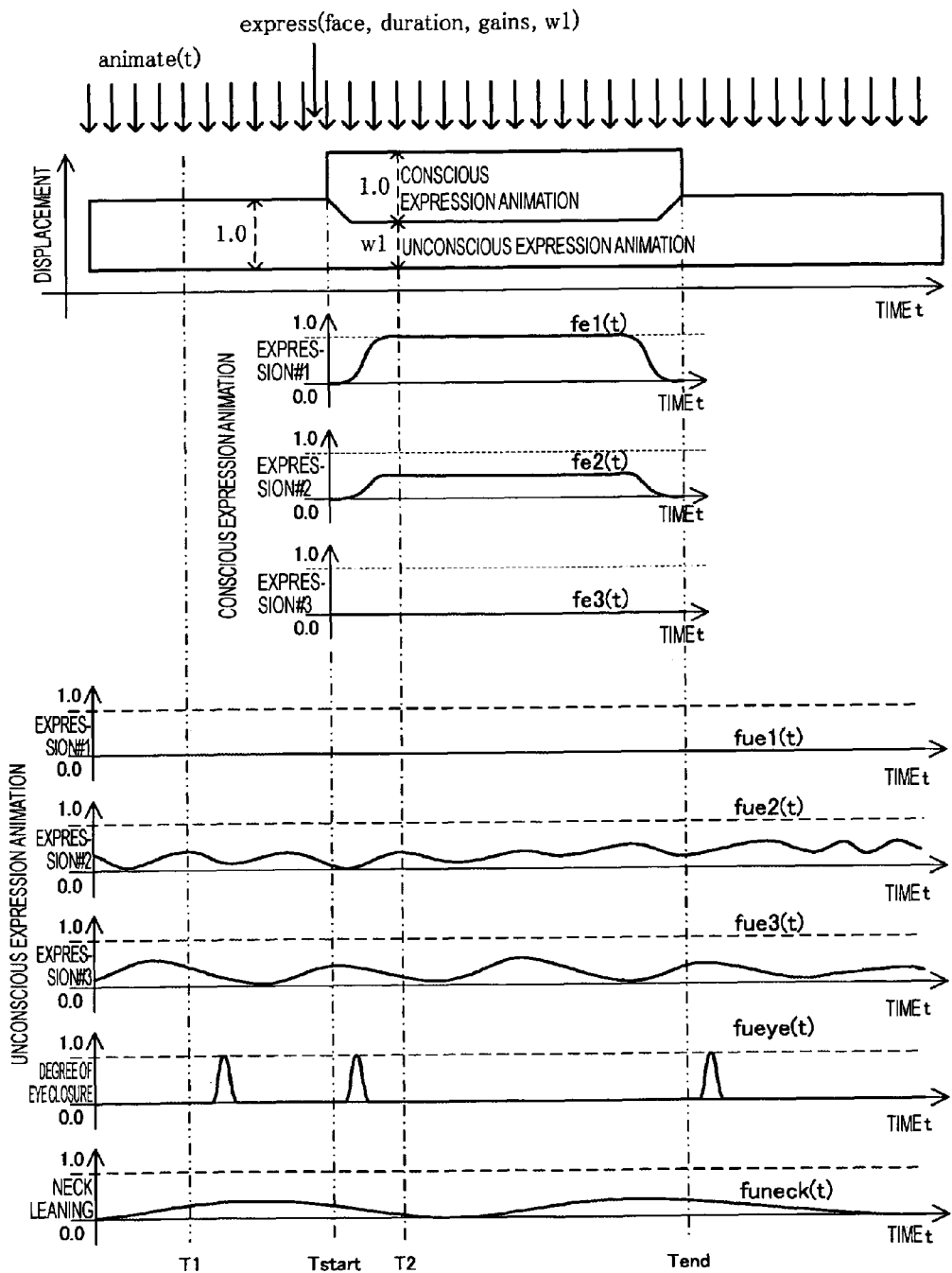
FIG. 7 is a diagram showing exemplary details of each facial expression according to an embodiment of the present invention.

FIG. 7 is a diagram showing exemplary details of each facial expression according to an embodiment of the present invention. Here, the case in which the above-described express function is called by the event handler 120 is shown by way of example.

As described previously, during animation display, the animate function is periodically called to update the face model data stored in the face model data storage section 330. In this example, the total five unconscious expression animation parameters, that is, three facial expressions #1 through #3, a degree of eye closure, and neck leaning, are shown by way of example. Each of these unconscious expression animation parameters is a function of time t, and can be chronologically changed. Here, the functions of the facial expressions #1, #2, and #3, the degree of eye closure, and the neck leaning are represented as fue1(t), fue2(t), fue3(t), fueye(t), and funeck(t), respectively. By mixing these functions, the constantly changing unconscious expression animation is reflected in the face model data.

When the express function is called, the conscious expression animation parameter is updated. Subsequently, the updated conscious expression animation parameter is mixed with the unconscious expression animation parameter at the time when the animate function is called soon after the conscious expression animation parameter has been updated. Consequently, in the subsequent stage, a mixed facial expression of a conscious facial expression specified by the conscious expression animation parameter and an unconscious facial expression that appears in the steady state is shown.

Here, the three facial expressions #1 through #3 for the unconscious expression animation are also used for facial expressions that serve as elements of the conscious expression animation. That is, the facial expressions #1, #2, and #3 for the conscious expression animation can be represented using the functions of fe1(t), fe2(t), and fe3(t), respectively.

At that time, during the time period in which the conscious expression animation is effective (from Tstart to Tend), the unconscious expression animation and the conscious expression animation are mixed in accordance with the following equations.

Facial expression #1 = $fe1(t) + w1 \times fue1(t)$

Facial expression #2 = $fe2(t) + w1 \times fue2(t)$

Facial expression #3 = $fe3(t) + w1 \times fue3(t)$

Degree of eye closure = $fueye(t)$

Neck leaning = $funeck(t)$

Accordingly, at the time T1, the three facial expressions #1 through #3 are given by the following equations.

Facial expression #1 = $fue1(T1)$

Facial expression #2 = $fue2(T1)$

Facial expression #3 = $fue3(T1)$

At the time T2, the three facial expressions #1 through #3 are given by the following equations.

Facial expression #1 = $fe1(T2) + w1 \times fue1(T2)$

Facial expression #2 = $fe2(T2) + w1 \times fue2(T2)$

Facial expression #3 = $fe3(T2) + w1 \times fue3(T2)$

Figure 8A:
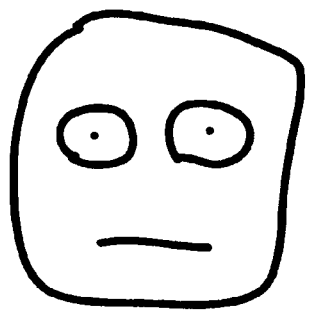
FIGS. 8A through 8E are diagrams showing the process of mixing facial expressions.
Figure 8B:
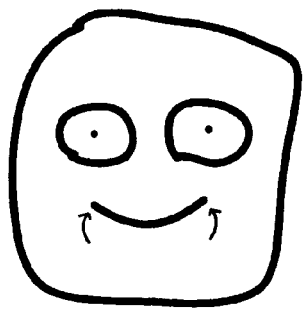
Figure 8C:
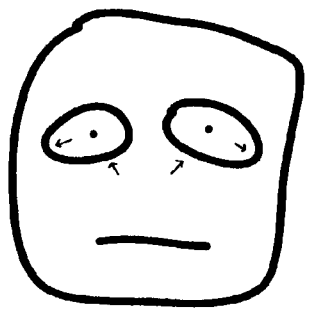
Figure 8D:
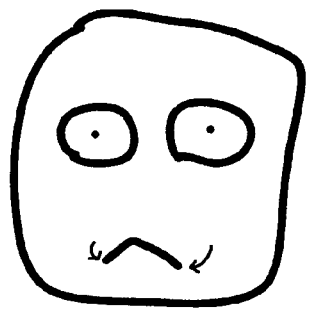

FIGS. 8A through 8E are diagrams showing the process of mixing facial expressions. FIG. 8A is an example of a basic face. Cases in which various facial expressions are mixed with this basic face will be considered. FIGS. 8B through 8D shows facial expressions acquired by individually mixing the facial expressions #1, #2, and #3 with the basic face shown in FIG. 8A.

In these examples, the facial expression #1 represents a facial expression in which the corners of the mouth curve upward like a U-shaped curve as shown in FIG. 8B, and the facial expression #2 represents a facial expression in which the individual outer corners of eyes turn downward as shown in FIG. 8C, and the facial expression #3 represents a facial expression in which the corners of the mouth turn downward like a chevron shape as shown in FIG. 8D.

If the facial expressions #1 through #3 shown in FIGS. 8B through 8D are applied for the unconscious expression animation shown in FIG. 7, the unconscious facial expression is slightly changed chronologically. That is, the individual outer corners of eyes gradually turn downward, as well as, the corners of the mouth gradually turn downward like a chevron shape. In this unconscious expression animation, since the value of the element of the facial expression #1 is "0.0", the corners of the mouth do not curve upward like a U-shaped curve.

Figure 8E:
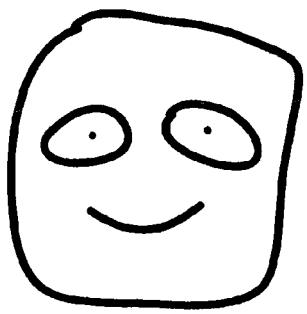

Subsequently, if the express function is called, the facial expressions #1 and #2 are mixed at the approximately mixture ratio of "1.0":"0.5". Consequently, a mixed expression in which the corners of the mouth curve upward like a U-shaped curve and the individual outer corners of eyes slightly turn downward is generated as shown in FIG. 8E.

Figure 9:
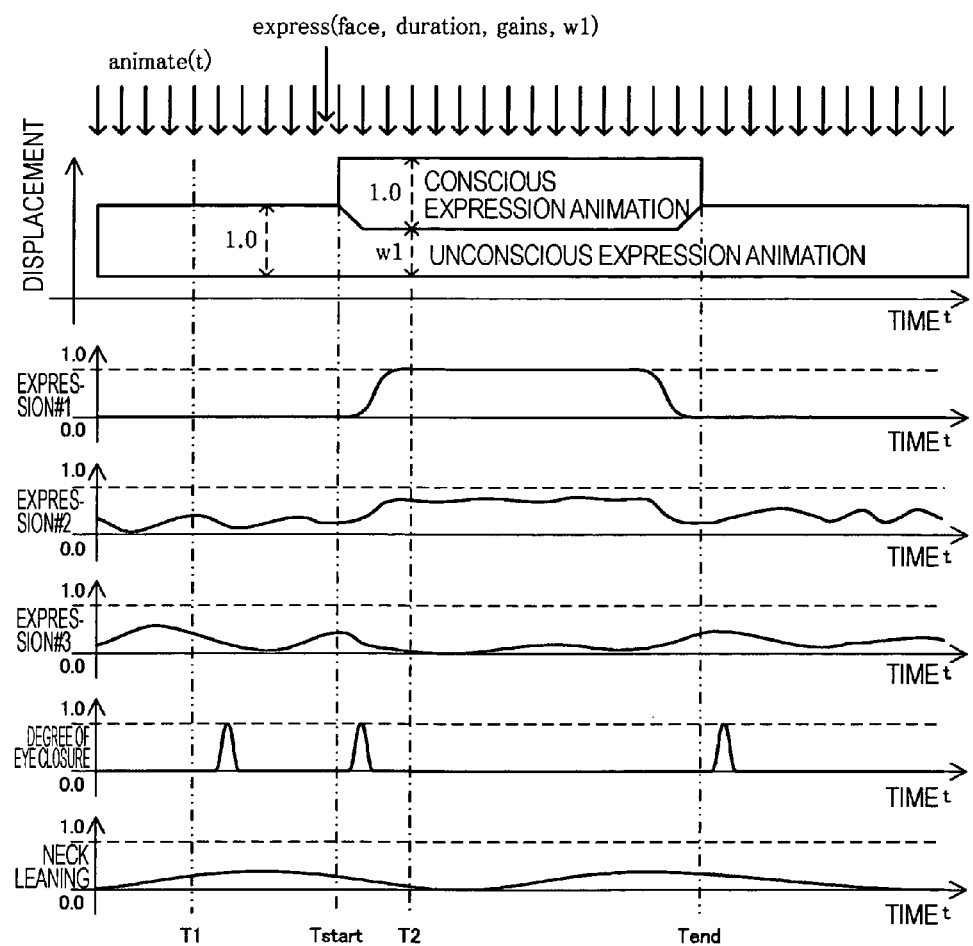
FIG. 9 is a diagram showing changes in individual facial expressions after a conscious expression animation and an unconscious expression animation have been mixed in an example of FIG. 7.

FIG. 9 is a diagram showing changes in individual facial expressions after the conscious expression animation and the unconscious expression animation have been mixed in the example of FIG. 7. As is apparent from FIG. 9, in the time period specified by the second parameter "duration" of the express function (from Tstart to Tend), the facial expressions #1 through #3 of the conscious and unconscious expression animations are individually mixed at the mixture ratio of "1.0":w1. Accordingly, the conscious expression animation is added to the unconscious expression animation in the state in which the facial fluctuation of the unconscious expression animation is maintained, whereby a natural expression can be achieved.

Figure 10:
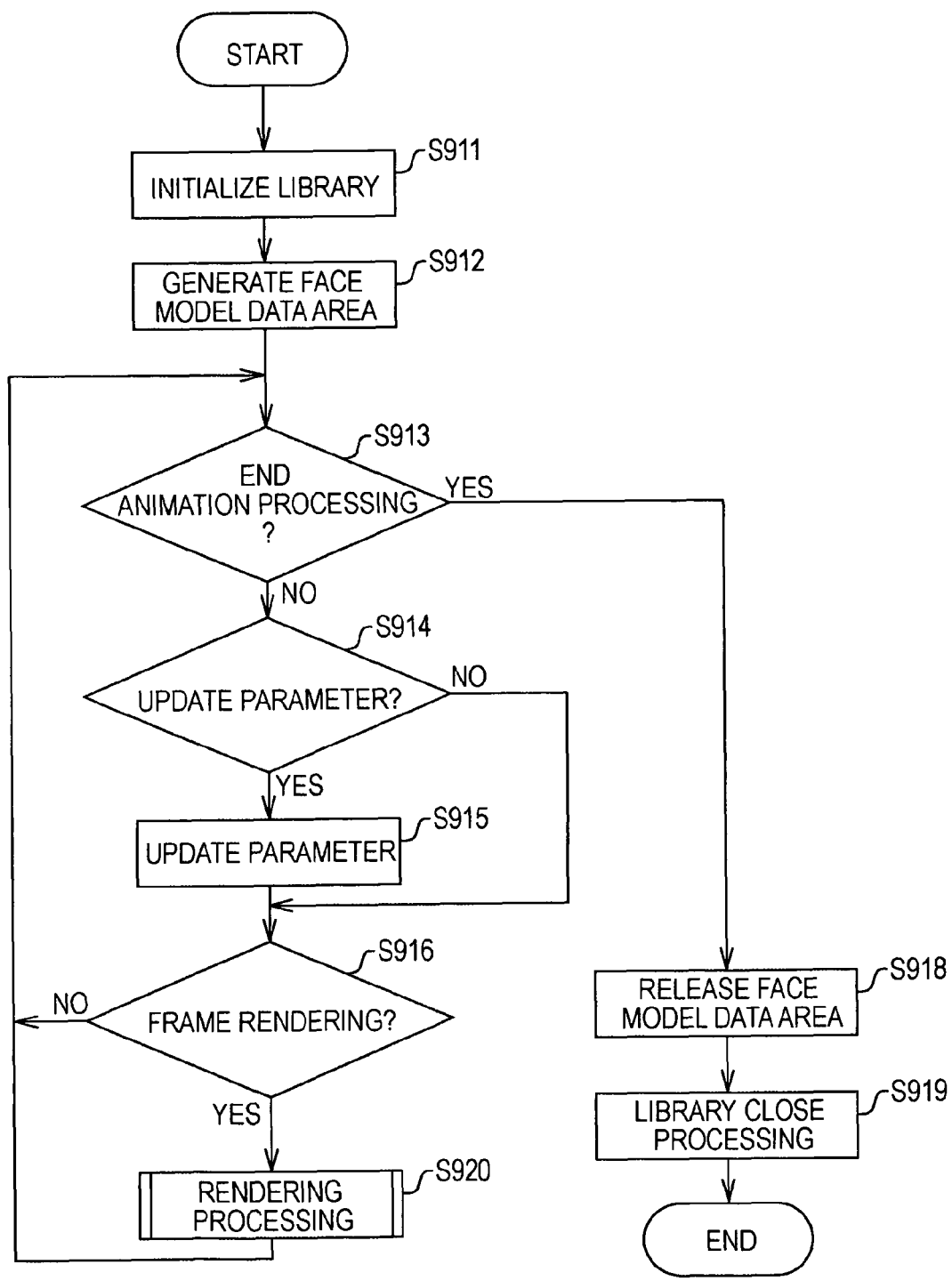
FIG. 10 is a flowchart showing an exemplary processing flow of the image processing apparatus according to an embodiment of the present invention.

FIG. 10 is a flowchart showing an exemplary processing flow of an image processing apparatus according to an embodiment of the present invention. First, in the initialization processing 110 of the application 100, the animation library 300 is initialized (step S911). Next, the face model data area is generated in the face model data storage section 330 (step S912).

Subsequently, when an animation parameter update instruction is given by the event handler 120 included in the application 100 (Yes in step S914), the animation parameter stored in the animation parameter storage section 310 included in the animation library 300 is updated by the animation engine 320 (step S915). Subsequently, when a face model data updating instruction and a rendering (frame rendering) instruction are given by the rendering routine 130 included in the application 100 (Yes in step S916), rendering processing is performed (step S920).

When animation processing ends (Yes in step S913), the face model data area is released (step S918), and then the close processing of the animation library 300 is performed (step S919).

Figure 11:
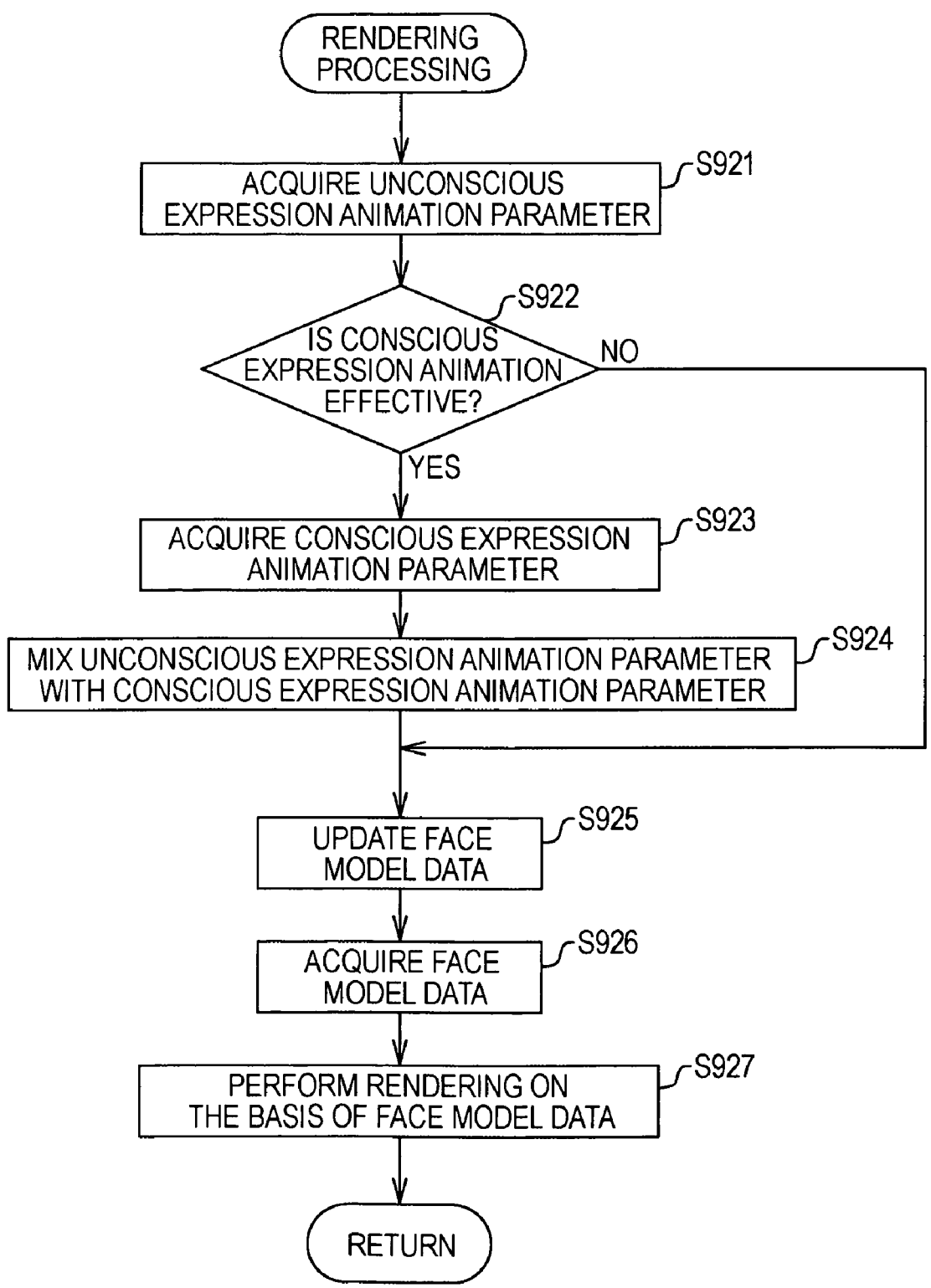
FIG. 11 is a flowchart showing an exemplary rendering processing flow according to an embodiment of the present invention.

FIG. 11 is a flowchart showing an exemplary processing flow of the rendering processing (step S920) according to an embodiment of the present invention. In this rendering processing, first, the unconscious expression animation parameter is acquired from the unconscious expression animation parameter storage unit 311 (step S921). When the conscious expression animation is effective (Yes in step S922), the conscious expression animation parameter is also acquired from the conscious expression animation parameter storage unit 312 (step S923). Subsequently, the unconscious and conscious expression animation parameters are mixed in the animation mixing unit 322 (step S924).

Consequently, the animation mixing unit 322 generates the face model data, and updates the face model data storage section 330 with the generated face model data (step S925). Subsequently, when the face model data acquisition unit 341 acquires the face model data stored in the face model data storage section 330 (step S926), the rendering unit 342 performs rendering processing on the basis of the acquired face model data (step S927).

Thus, according to an embodiment of the present invention, the unconscious expression animation parameter stored in the unconscious expression animation parameter storage unit 311 and the conscious expression animation parameter stored in the conscious expression animation parameter storage unit 312 are mixed in the animation mixing unit 322 to generate face model data, whereby a natural facial expression can be easily obtained.

An embodiment of the present invention has been described by way of example. The correspondence between the features of the claims and the specific elements disclosed in an embodiment of the present invention is discussed below. However, it should be understood by those skilled in the art that various modifications, combinations, sub-combinations and alterations may occur depending on design requirements and other factors insofar as they are within the scope of the appended claims or the equivalents thereof.

That is, an unconscious expression parameter storing unit corresponds to, for example, the unconscious expression animation parameter storage unit 311, and a conscious expression parameter storing unit corresponds to, for example, the conscious expression animation parameter storage unit 312, and a mixing unit corresponds to, for example, the animation mixing unit 322, and a rendering unit corresponds to, for example, the rendering unit 342.

Furthermore, a parameter updating unit corresponds to, for example, the parameter update unit 321.

Furthermore, a face model data storing unit corresponds to, for example, the face model data storage section 330.

Furthermore, a parameter update instructing unit corresponds to, for example, the event handler 120, and a face model data generation instructing unit and a rendering processing instructing unit correspond to, for example, the rendering routine 130.

Furthermore, a procedure for acquiring an unconscious expression parameter from the unconscious expression parameter storing unit corresponds to, for example, step S921, and a procedure for acquiring a conscious expression parameter from the conscious expression parameter storing unit and mixing the acquired conscious expression parameter with the unconscious expression parameter when a consciously expressed facial expression is effective corresponds to, for example, steps S922 through S924, and a procedure for generating face model data on the basis of the mixed parameter of the conscious and unconscious expression parameters when the consciously expressed facial expression is effective, or on the basis of the unconscious expression parameter when the consciously expressed facial expression is not effective corresponds to, for example, step S925, and a procedure for rendering a facial expression on the basis of the face model data corresponds to, for example, step S927.

The processing flows described in the embodiment of the present invention may be considered as a method having a series of these processing flows, a program causing a computer to perform the series of these processing flows, and a recording medium storing the program.

What is claimed is:

1. An image processing apparatus comprising:
unconscious expression parameter storing means for storing an unconscious parameter specifying an unconscious facial expression, the unconscious facial expression being applied to a model automatically at a periodic rate without requiring user input to apply the unconscious facial expression;
conscious expression parameter storing means for storing a conscious parameter specifying a conscious facial expression, the conscious facial expression being applied to the model after being specified and customized by a user, the user customizing the conscious facial expression by instructing the apparatus to execute a function having a plurality of user-specified parameters defining attributes of a specific conscious facial expression;
parameter updating means for updating the conscious parameter to include animation features defined by the user-specified parameters;
mixing means for generating face model data by mixing the unconscious expression parameter and the updated conscious expression parameter; and
rendering means for rendering a facial expression on the basis of the face model data.

2. The image processing apparatus according to claim 1, further comprising face model data storing means for storing the face model data, and
wherein the mixing means generates the face model data and stores the generated face model data in the face model data storing means in response to a first instruction, and
wherein the rendering means acquires the face model data from the face model data storing means and performs rendering processing on the basis of the acquired face model data in response to a second instruction.

3. An image processing apparatus comprising:
face model data storing means for storing face model data used to render a facial expression;
unconscious expression parameter storing means for storing an unconscious parameter specifying an unconscious facial expression, the unconscious facial expression being applied to a model automatically at a periodic rate without requiring user input to apply the unconscious facial expression;
conscious expression parameter storing means for storing a conscious parameter specifying a conscious facial expression, the conscious facial expression being applied to the model after being specified and customized by a user, the user customizing the conscious facial expression by instructing the apparatus to execute a function having a plurality of user-specified parameters defining attributes of a specific conscious facial expression;
parameter update instructing means for instructing updating of the conscious expression parameter to include animation features defined by the user-specified parameters;
parameter updating means for updating the conscious expression parameter stored in the conscious expression parameter storing means in response to the parameter update instruction;
face model data generation instructing means for instructing generation of the face model data;
mixing means for mixing the unconscious expression parameter and the updated conscious expression parameter to generate the face model data and storing the generated face model data in the face model data storing means in response to the face model data generation instruction;
rendering processing instructing means for instructing rendering of a facial expression; and
rendering means for rendering a facial expression on the basis of the face model data stored in the face model data storing means in response to the rendering processing instruction.

4. An image processing method for an image processing apparatus that includes,
unconscious expression parameter storing means for storing an unconscious parameter specifying an unconscious facial expression, the unconscious facial expression being applied to a model automatically at a periodic rate without requiring user input to apply the unconscious facial expression, and
conscious expression parameter storing means for storing a conscious parameter specifying a conscious facial expression, the conscious facial expression being applied to the model after being specified and customized by a user, the user customizing the conscious facial expression by executing a function having a plurality of user-specified parameters defining attributes of a specific conscious facial expression, the image processing method comprising the steps of:

acquiring the unconscious expression parameter from the unconscious expression parameter storing means;

acquiring the updated conscious expression parameter from the conscious expression parameter storing means and mixing the acquired conscious expression parameter with the unconscious expression parameter when the consciously expressed facial expression is effective;

generating face model data on the basis of the mixed parameter of the conscious and unconscious expression parameters when the consciously expressed facial expression is effective, or on the basis of the unconscious expression parameter when the consciously expressed facial expression is not effective; and rendering a facial expression on the basis of the face model data.

5. A computer-readable storage medium storing a computer-readable program which, when executed by a processor, causes a computer to execute a method of image processing, the method comprising:

storing an unconscious parameter specifying an unconscious facial expression, the unconscious facial expression being applied to a model automatically at a periodic rate without requiring user input to apply the unconscious facial expression;

storing a conscious parameter specifying a conscious facial expression, the conscious facial expression being applied to the model after being specified and customized by a user, the user customizing the conscious facial expression by executing a function having a plurality of user-specified parameters defining attributes of a specific conscious facial expression;

updating the conscious parameter to include animation features defined by the user-specified parameters;

acquiring the unconscious expression parameter from the unconscious expression parameter storing means;

acquiring the updated conscious expression parameter from the conscious expression parameter storing means and mixing the acquired conscious expression parameter with the unconscious expression parameter when the consciously expressed facial expression is effective;

generating face model data on the basis of the mixed parameter of the conscious and unconscious expression parameters when the consciously expressed facial expression is effective, or on the basis of the unconscious expression parameter when the consciously expressed facial expression is not effective; and rendering a facial expression on the basis of the face model data.

6. An image processing apparatus comprising:

an unconscious expression parameter storing unit configured to store an unconscious parameter specifying an unconscious facial expression, the unconscious facial expression being applied to a model automatically at a periodic rate without requiring user input to apply the unconscious facial expression;

a conscious expression parameter storing unit configured to store a conscious parameter specifying a conscious facial expression, the conscious facial expression being applied to the model after being specified and customized by a user, the user customizing the conscious facial expression by instructing the apparatus to execute a function having a plurality of user-specified parameters defining attributes of a specific conscious facial expression;

a parameter updating unit configured to update the conscious parameter to include animation features defined by the user-specified parameters;

a mixing unit configured to generate face model data by mixing the unconscious expression parameter and the conscious expression parameter; and a rendering unit configured to render a facial expression on the basis of the face model data.

7. An image processing apparatus comprising:

a face model data storing unit configured to store face model data used to render a facial expression;

an unconscious expression parameter storing unit configured to store an unconscious parameter specifying an unconscious facial expression, the unconscious facial expression being applied to a model automatically at a periodic rate without requiring user input to apply the unconscious facial expression;

a conscious expression parameter storing unit configured to store a conscious parameter specifying a conscious facial expression, the conscious facial expression being applied to the model after being specified and customized by a user, the user customizing the conscious facial expression by instructing the apparatus to execute a function having a plurality of user-specified parameters defining attributes of a specific conscious facial expression;

a parameter update instructing unit configured to instruct updating of the conscious expression parameter to include animation features defined by the user-specified parameters;

a parameter updating unit configured to update the conscious expression expression parameter stored in the conscious expression parameter storing unit in response to the parameter update instruction;

a face model data generation instructing unit configured to instruct generation of the face model data;

a mixing unit configured to mix the unconscious expression parameter and the updated conscious expression parameter to generate the face model data and store the generated face model data in the face model data storing unit in response to the face model data generation instruction;

a rendering processing instructing unit configured to instruct rendering of a facial expression; and a rendering unit configured to render a facial expression on the basis of the face model data stored in the face model data storing unit in response to the rendering processing instruction.

8. An image processing method for an image processing apparatus that includes, an unconscious expression parameter storing unit configured to store an unconscious parameter specifying an unconscious facial expression, the unconscious facial expression being applied to a model automatically at a periodic rate without requiring user input to apply the unconscious facial expression, and a conscious expression parameter storing unit configured to store a conscious parameter specifying a conscious facial expression, the conscious facial expression being applied to the model after being specified and customized by a user, the user customizing the conscious facial expression by executing a function having a plurality of user-specified parameters defining attributes of a specific conscious facial expression, the image processing method comprising the steps of:

acquiring the unconscious expression parameter from the unconscious expression parameter storing unit;

acquiring the conscious expression parameter from the conscious expression parameter storing unit and mixing the acquired conscious expression parameter with the unconscious expression parameter when the consciously expressed facial expression is effective;
generating face model data on the basis of the mixed parameter of the conscious and unconscious expression parameters when the consciously expressed facial expression is effective, or on the basis of the unconscious expression parameter when the consciously expressed facial expression is not effective; and
rendering a facial expression on the basis of the face model data.

* * * * *